United States Patent [19]

Takagi

[11] 4,298,418
[45] Nov. 3, 1981

[54] METHOD AND APPARATUS FOR THE MANUFACTURE OF A LOCKED MATERIAL OF FILAMENT

[76] Inventor: Sadaaki Takagi, 39, Mikage-cho, Okazaki-shi, Aichi-ken, Japan

[21] Appl. No.: 107,364

[22] Filed: Dec. 26, 1979

[30] Foreign Application Priority Data

Dec. 29, 1978 [JP] Japan .............................. 53/163086

[51] Int. Cl.³ .......................................... D04H 1/48
[52] U.S. Cl. .................................. 156/296; 156/62.4; 156/148; 156/274; 264/24; 264/24; 264/128; 425/371; 156/379.6; 118/44; 118/620
[58] Field of Search .................... 156/62.2, 62.4, 62.6, 156/148, 273, 274, 380, 296; 264/24, 128; 425/364 R, 371

[56] References Cited

U.S. PATENT DOCUMENTS

| 4,154,051 | 5/1979 | Takagi | 57/284 |
| 4,164,599 | 8/1979 | Kessler | 156/273 |
| 4,172,174 | 10/1979 | Takagi | 428/288 |
| 4,221,950 | 9/1980 | Lamberts et al. | 219/10.81 |

*Primary Examiner*—John E. Kittle
*Attorney, Agent, or Firm*—Gordon W. Hueschen

[57] ABSTRACT

A method for the manufacture of a locked material of filaments, which comprises compression molding in a prescribed shape short fibers of three-dimensionally crimped synthetic filaments, applying an adhesive liquid to the shaped article of filaments thus obtained, then lifting the shaped article in a substantially vertical direction and, at the same time, subjecting it to dielectric heating and thereby drying the adhesive adhering to the shaped article.

18 Claims, 6 Drawing Figures

METHOD AND APPARATUS FOR THE MANUFACTURE OF A LOCKED MATERIAL OF FILAMENT

FIELD OF INVENTION AND PRIOR ART

This invention relates to a method and an apparatus for the manufacture of a locked material of filament, and more particularly to a method and an apparatus for the manufacture of a locked material formed of an aggregate of three-dimensionally crimped synthetic filaments, which locked material is characterized by having an adhesive uniformly dispersed therein and caused to adhere fast to the component filaments thereof.

I formerly made a discovery that a locked material of filament obtained by cutting three-dimensionally crimped filaments to a prescribed (staple) length and producing a wad therefrom, simultaneously opening and compression molding the wad in a prescribed shape and adding an adhesive thereto and causing the component filaments thereof to be bonded mutually therewith at their points of contact possesses high repulsive elasticity, exhibits perviousness to gases and excels in the cushioning property (U.S. Pat. No. 4,172,174). I further discovered former that a locked material, namely a cushion material wherein the component filaments in an aggregate of three-dimensionally crimped synthetic filaments are mutually bonded with an adhesive at their points of contact and the portions having densely intertwined partially therein the crimped filaments of varying shape obtained by allowing the filaments to be independently deformed as by elongation and contraction and thereby permitting the curls in the filaments to acquire partial directionality are formed in the direction of tending to generate a load strength and, further the intertwined portions of the filaments are distributed so as to fulfill the requirement on load strength, produces a still better effect.

These locked materials of filament are manufactured by compressing a wad of three-dimensionally crimped filaments by an endless belt and/or roller, a rubbing device or other means thereby forming a block aggregate of filaments possessing a prescribed bulk density and after needling, or not needling, the formed block to a prescribed needle density with needles provided with barbs, spraying an adhesive solution downwardly onto the formed block of filament being conveyed on an endless belt travelling in a substantially horizontal direction or immersing the formed block of filament in the adhesive solution and thereafter lifting the block from the solution and heating and drying the wet block on an endless belt travelling in a substantially horizontal direction.

When the adhesive is applied to the formed block (shaped article) of filament in the manner described above, however, the adhesive which has been caused to adhere to the component filaments of the block flows down the interior of the formed block before it is completely dried. Particularly, the downflow of the adhesive is intensified when it loses viscosity upon exposure to heat. The locked material of filament thus produced has suffered from a disadvantage that the amount of the adhesive allowed to adhere to the component filaments is quite uneven, namely, small in the upper portion and large in the lower portion. The adhesive thus released from the component filaments not only flows down the interior of the formed block but also drips onto the endless belt conveying the formed block and smears the belt. This method, therefore, suffers degradation of operational efficiency and entails loss of the adhesive itself. When the application of the adhesive is effected by the immersion method which generally involves proximate installation of a heating device and a solution bath, the radiant heat from the heating device has a possibility of additionally heating the adhesive solution in the bath. Consequently, this method has a serious disadvantage that because of the evaporation of the solution by the heat, much of the adhesive itself is lost and the solution has its composition constantly changed.

OBJECTS OF THE INVENTION

It is, therefore, an object of this invention to provide a method and an apparatus for the manufacture of a locked material of filament wherein the adhesive is uniformly dispersed and caused to adhere fast to the component filaments therein.

Another object of this invention is to provide a novel method for drying the adhesive which has been applied to the locked material of filament.

BRIEF DESCRIPTION OF THE INVENTION

These objects are attained by a method for the manufacture of a locked material of filament, which comprises compression molding a wad of short fibers of a three-dimensionally crimped synthetic filament in a prescribed shape, applying an adhesive liquid to the shaped article of filament obtained as described above, then lifting the shaped article of filament in a substantially vertical direction from the liquid and simultaneously drying the adhesive adhering to the shaped article by dielectric heating.

The method described above is effected by an apparatus for the manufacture of a locked material of filament, which comprises means serving to compression mold the short fibers of a three-dimensionally crimped synthetic filament, means serving to simultaneously convey the shaped article of filament produced by the aforementioned compression molding means and applying an adhesive liquid to the shaped article in transit, means for lifting in a substantially vertical direction the shaped article of filament having the adhesive liquid applied thereto, and means for simultaneously dielectric heating it.

Figure 1:
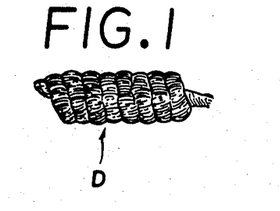
FIG. 1 is a perspective view of a double-twist filament.
Figure 2:
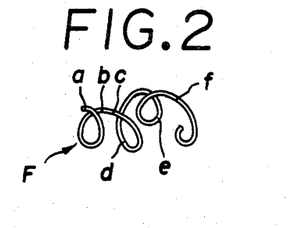
FIG. 2 is a perspective view of a three-dimensionally crimped filament.

The synthetic fibers which are advantageously used for the method of this invention are polyester, polyamide, polypropylene, etc. Among these, polyester is most desirable. The fiber as a monofilament is desired to have a thickness within the range of from 30 to 2,000 deniers, preferably from 50 to 1,000 deniers, and most preferably from 100 to 600 deniers. The filament is required to contain three-dimensional curls. By the term "three-dimensional curls" as used herein is meant those three-dimensional curls in the broad sense of the word, such as two directional and three-directional curls, for example. A three-directional three-dimensionally crimped filament is preferred. For example, a three-directional three-dimensionally crimped filament F illustrated in FIG. 2 is obtained by preparing a double-twist filament D illustrated in FIG. 1 by use of a method and an apparatus disclosed by the same inventor in the specification of U.S. Pat. No. 4,154,051 and then cutting the double-twist filament D to a prescribed length and untwisting it. The cut filaments aggregated in the wad are desired to have a length within the range of from 25 to 200 mm, preferably from 60 to 150 mm. Thus, with reference to FIG. 2, the part of the filament at "a" coils over the part at "b." The part at "c" coils over the part at "d." The part at "e," however, coils under the part at "f" and not over it. Thus, the section of the filament from "e" to "d" falls under two bites or coils of the helix. This is what may properly be called a disoriented helix and is very much like a helical telephone cord which gets out of whack when one of the coils thereof becomes disoriented with respect to the others.

BRIEF DESCRIPTION OF THE DRAWINGS

Now, the method and the apparatus according to the present invention will be described with reference to the accompanying drawing.

DETAILED DESCRIPTION OF THE INVENTION

Figure 3:
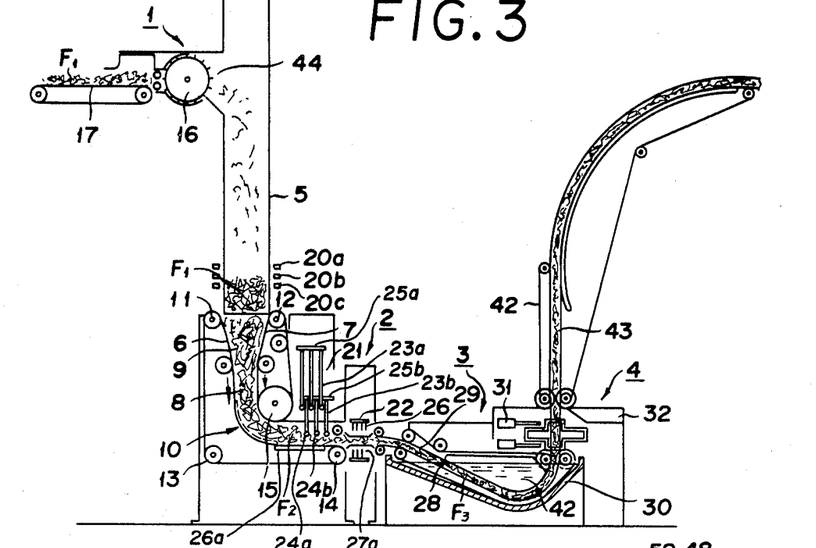
FIG. 3 is a schematic sectioned view illustrating one preferred embodiment of the apparatus for the manufacture of a locked material of filament according to this invention.
Figure 4:
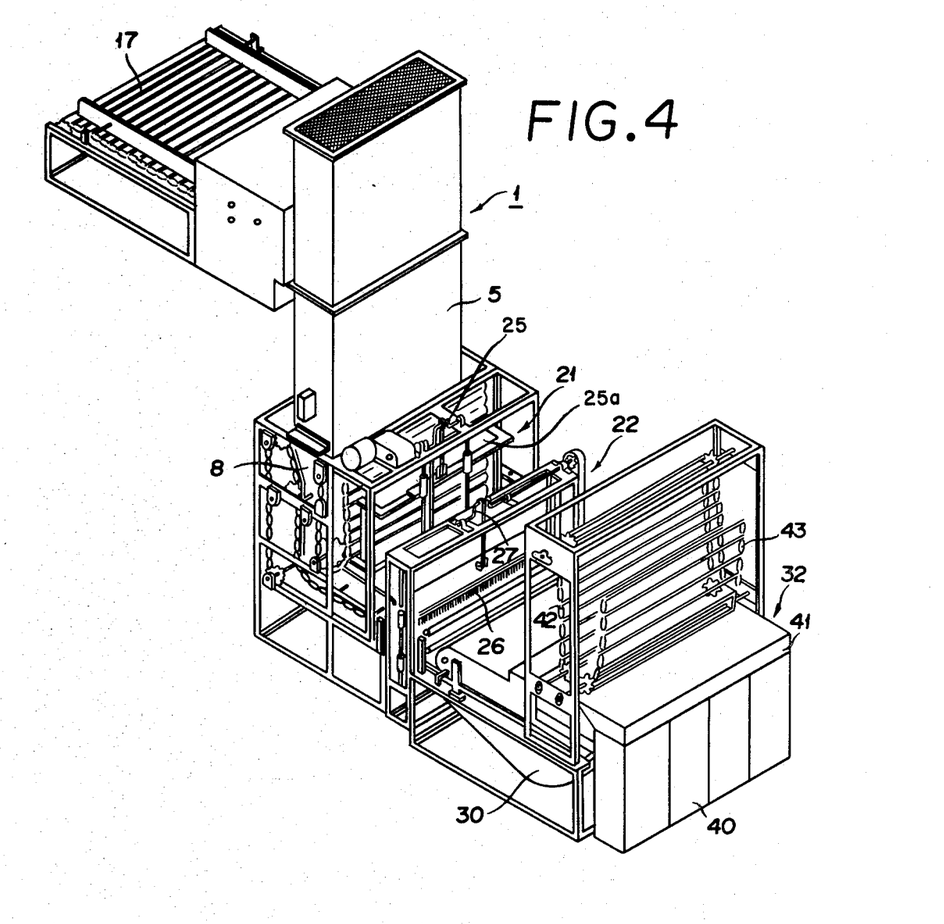
FIG. 4 is a perspective view of the essential part of the apparatus illustrated in FIG. 3.

The apparatus according to this invention is mainly composed of the following component elements as illustrated in FIGS. 3–4. The main component elements are a filament feed device 1, a molding device 2, an adhesive application device 3 and a drying device 4. The filament feed device 1 comprises a filament feed inlet 5 possessing an opening in a substantially vertical direction. The cross-sectional area of this filament feed inlet 5 is constant throughout the entire length of the inlet. Beneath this filament feed inlet 5 are disposed endless conveyors 6, 7 and a parallelly opposed pair of guide plates 8, 8. The upper portions of the endless conveyors 6, 7 form a downwardly converging space 9 and the lower portions thereof run parallelly to each other and form a compression zone 10 for forming an aggregate of fillaments. The opening at the upper end of the aforementioned downwardly converging space 9 communicates with the opening at the lower end of the aforementioned filament feed inlet 5. These endless belts 6, 7 may be rubber belts or metal belts like those used in a caterpillar. Optionally, they may be substituted by two series of numerous closely juxtaposed rollers. Since the upper end of the compression zone 10 directly communicates with the lower end of the filament feed inlet 5, the upper portion the compression zone is formed in a substantially vertical direction. Since the lower portion of the compression zone 10 has bearing on the application of the adhesive and other steps of treatment as described afterward, it may be formed in a horizontal direction as illustrated in FIG. 3. These endless conveyors 6, 7 are driven in the downward direction (as indicated by the arrows) by sprockets 11, 12, 13, 14, 15, etc. which are interlocked to a power source (not shown). The cross-sectional area at the bottom of the compression zone 10 is smaller than the cross-sectional area of the filament feed inlet 5. An opener 16 for disentangling the wad of filaments $F_1$ supplied by conveyor 17 is placed in close juxtaposition immediately next to the upper end of the filament feed inlet 5. Any suitable means for forming the wad of filaments and feeding it to conveyor 17 can be used. The height of the pile of filaments which accumulates in the filament feed inlet 5 can be automatically controlled by a level control device (not shown) which is provided with sensors $20a$, $20b$, and $20c$ such as photoelectric tubes, electroluminescent diodes-photo-transistors, etc. The compression molding device for filaments is not necessarily limited to the compression zone of the aforementioned construction. It may be formed of an endless belt and rollers disposed at a suitable vertical distance from the endless belt, whereby filaments piled to a prescribed thickness on the endless belt in motion are compressed to a prescribed bulk density by being passed under the rollers.

The molding device 2 comprises the compression zone 10 described above in conjunction with a rubbing device 21 and a needling device 22 which are optionally installed. The compacting device 21 serves the purpose of imparting vertical reciprocating motion through the medium of crank 25 attached to horizontal bars $25a$ and $25b$ attached to the leading end of rods $23a$ and $23b$ and, horizontal bars $25a$ and $25b$ attached to the leading ends of rods $23a$ and $23b$ and, by virtue of the resultant compacting motion of the bars $24a$ and $24b$, causing the aggregate of filaments $S_2$ to be compacted or compressed against plate $26a$ to a prescribed bulk density. The needling device 22 serves the purpose of imparting a vertical reciprocating motion through the medium of a crank 27 to a plurality of needles 26 which are provided with at least one barb thereby subjecting the aggregate of filaments $F_2$ to a needling treatment, imparting compressive strength in that direction to the aggregate of filaments and enabling the aggregate to acquire a cushioning property.

Figure 5:
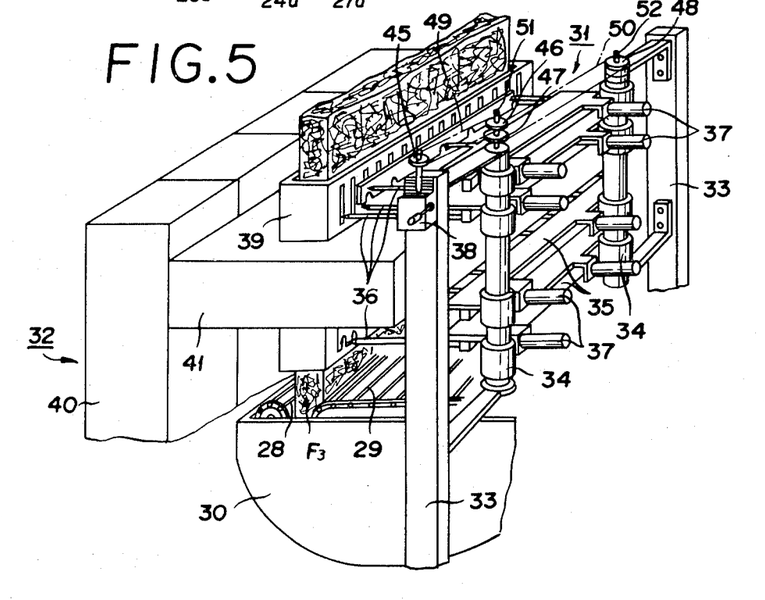
FIG. 5 is a perspective view of an dielectric heating device to be used for the purpose of this invention.

The molding device 2 is immediately followed by the adhesive application device 3. This adhesive application device 3 comprises conveyor means 28, 29 such as rolls, endless belts or metal endless belts like those used in a caterpillar, for example, and an adhesive liquid tank 30. Above the adhesive liquid tank 30 is disposed the drying device 4. This drying device 4 is provided, as illustrated in FIG. 5, with a carrier device serving to lift in a substantially vertical direction the shaped article of filaments $F_3$ having the adhesive already applied thereto and a dielectric heating device 32. The carrier device 31 is formed of an elevating cam device 34 fixed on a rack 33, an arm 35 interlocked to the cam device, a plurality of needles 36 horizontally disposed on the arm 35, a hydraulic cylinder 37 serving to impart a reciprocating motion in the horizontal direction to the needles 36, and a change gear 38. The aforementioned needles 36 are desired to be disposed in at least two rows each on the upper and lower ends of a guide 39 for retaining the inducting heating device 32. The two rows of needles installed on the upper end, for example, are alternately inserted into the aggregate of filaments $F_3$ for the purpose of preventing the aggregate $F_3$ from disintegration and, at the same time, precluding possible leakage of electric waves. This is also true of the two rows of needles installed on the lower end. In FIG. 5, the rows of needles 36 are illustrated as being inserted into the aggregate of filaments $F_3$ from one side inwardly. Optionally, they may be inserted from both sides. The dielectric heating device 32 comprises a magnetron 40 and a range 41. The aggregate of filaments $F_3$ is passed through the guide 39 which is disposed inside the range 41.

The drying device 4 is immediately followed by conveyor means 42, 43 such as endless conveyors.

Now, the method for manufacturing a locked material of filament by use of the apparatus of the foregoing construction above will be described. Three-dimensionally crimped synthetic filaments $F_1$ of a large denier size as shown in FIG. 2 are forwarded by a conveyor device such as the belt conveyor 17 to the opener 16 as shown in FIGS. 3-4 and are blown out of an outlet of the opener into the filament feed inlet 5 by means of a blower (not shown). The filaments $F_1$ thus entering the inlet 5 gradually accumulate in the lower portion of the filament feed inlet 5 and eventually reach the compression zone 10 of the molding device. The aggregate of filaments $F_1$ which is being conveyed by the motion of the endless conveyors 6, 7 is compressed to the prescribed compression ratio (bulk density) while it is in the process of traveling the interior of the compression zone 10 owing to the diminishing cross-sectional area in the compression zone 10. Since the height of the pile of filaments $F_1$ within the filament feed inlet 5 and the speed of the endless conveyors 6, 7 have an effect on the bulk density of the compressed aggregate of filaments $F_2$, the feed rate of filaments $F_1$ and the driving speed of the endless conveyors 6, 7 are controlled through the detection of the height of the pile by means of the sensors 20a, 20b and 20c. Optionally, the compressed aggregate of filaments $F_2$ is subjected to a compacting motion produced by the bars 24 and adjusted to the prescribed bulk density while it is in the process of passing the compacting device 21. The aggregate block of filaments thus produced by the compression molding treatment described above generally possesses a bulk density within the range of from 0.002 to 0.2 g/cm$^3$, preferably from 0.005 to 0.008 g/cm$^3$.

The shaped article of filaments $F_2$ resulting from the foregoing compression molding treatment is conveyed by the conveyors means 28, 29, immersed in the adhesive liquid 42 held in the adhesive liquid tank 30, then pulled up in a vertical or substantially vertical direction by the carrier device 31.

While the shaped article is being lifted, possible downflow of the adhesive liquid from this article can be precluded to an extent by virtue of the surface tension of the liquid itself. In the meantime, any excess adhesive liquid adhering to the shaped article of filaments $F_3$ flows down the interior of the shaped article. The shaped article is subsequently passed through the dielectric heating device 32, so that the heat generated thereby evaporates water or a solvent from the adhesive solution and, at the same time, hardens the adhesive to some extent and consequently bonds the component filaments at their points of contact. The shaped article is further moved on by the conveyor means 42, 43 and the resultant locked material of filaments is cut to a prescribed size. Where there is a possibility of the shaped article being torn while it is being lifted in the vertical direction, the shaped article while travelling horizontally prior to the immersion treatment may be sprayed with a small amount of adhesive liquid and then dried for the purpose of temporary adhesion of component filaments.

Typical examples of the adhesive which is advantageously used herein include synthetic rubbers such as styrene-butadiene rubber, acrylonitrile-butadiene rubber, chloroprene rubber and urethane rubber, natural rubbers, vinyl acetate type adhesives, cellulose acetate type adhesives and acrylic type adhesives. The adhesive thus selected is used in the form of latex, emulsion or solution, preferably in the form of latex or emulsion. The amount of the adhesion to be applied is generally in the range of from 10 to 200 g/100 g of filaments, preferably from 50 to 120 g/100 g of filaments, on the solids content basis.

The aggregate of filaments $F_3$ to which the adhesive liquid has been applied is now passed through the dielectric heating device 32. During the passage, the two rows of needles disposed each on the upper and lower ends of the guide 39 are alternately inserted into the aggregate $F_3$. This treatment serves to prevent the aggregate $F_3$ from being disentangled or torn while it is being lifted and, at the same time, preclude possible leakage of high-frequency electric waves. These rows of needles 36 are operated as follows. The motive force which has issued from a power souce such as a motor (not shown) and has been adjusted by the change gear 38 actuates the sprocket 45 and, by virtue of the rotation of this sprocket 45, is transmitted by the medium of a chain 49 to the sprockets 46, 47. It is also transmitted by the medium of the chain 50 to the sprocket 48. By the rotary force transmitted as described above to the sprockets 46, 48, the cam shafts 51, 52 are rotated and, by virtue of the cam mechanism of the elevating cam device 34, the row of needles 36 which has been inserted into the aggregate of filaments $F_3$ is elevated at a speed equalling the travelling speed of the aggregate $F_3$ and, upon lapse of a fixed length of time, retracted by the action of the cylinder 37. At the same time, the other row of needles 36 is inserted into the aggregate $F_3$ by the action of the cylinder 37 and then is elevated in consequence of the travel of the aggregate $F_3$. At the opposite ends of the guide 39, therefore, one or the other rows of needles 36 is inserted in the aggregate $F_3$ at all times.

Figure 6:
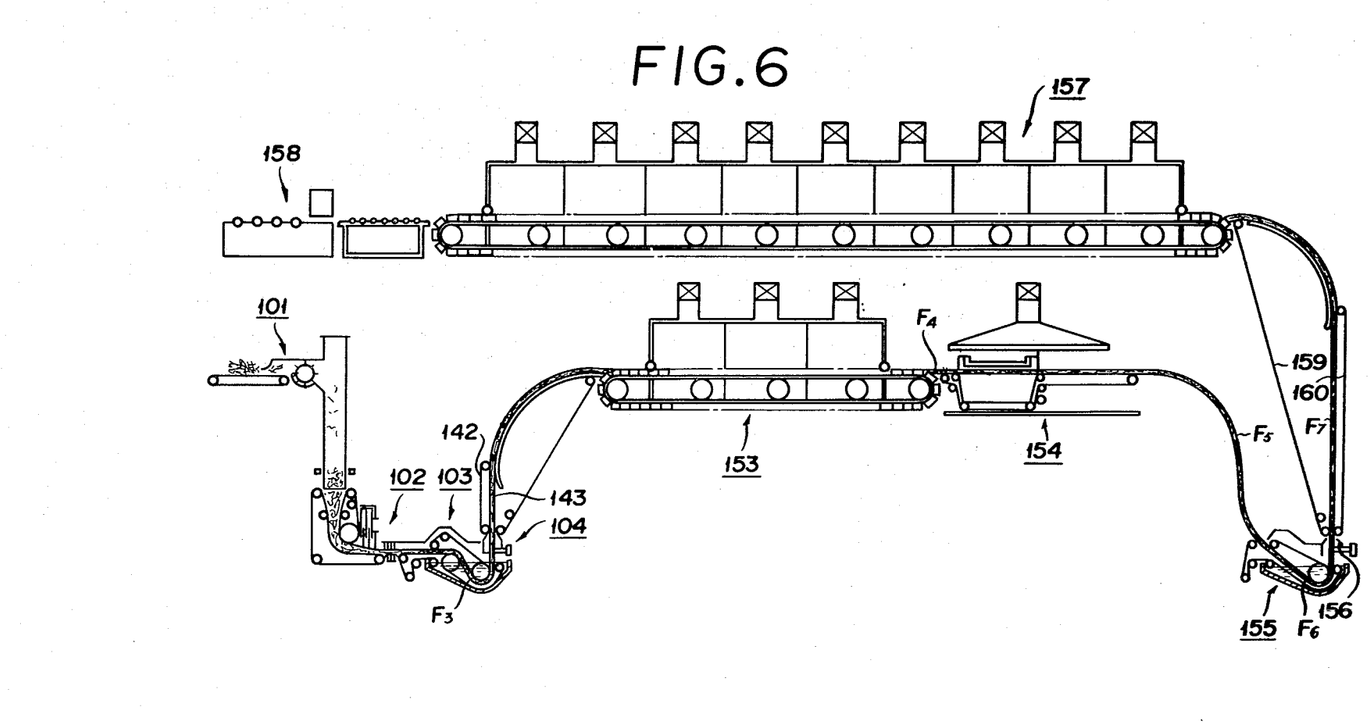
FIG. 6 is a schematic sectioned view of another preferred embodiment of the apparatus according to this invention.

While the shaped article of filaments $F_3$ is passing the interior of the high-frequency dielectric heating device 32, it is irradiated by an electric wave having a high frequency in the range of from 1 MHz to 300 GHz, preferably from 10 MHz to 30 GHz, and a current density of from 0.1 to 10 kwh/cm$^3$, preferably from 0.5 to 5 kwh/cm$^3$, which is enough for the purpose of causing the shaped article of filaments to acquire a definite shape upon thermal drying of the adhesive solution. This treatment serves the purpose of evaporating water or a solvent from the adhesive liquid and consequently bonding the component filaments at their points of contact. When the shaped article of filaments $F_3$ is pulled up, it is not torn or otherwise damaged in transit by its own weight or the weight of the adhesive liquid adhering thereto. Optionally the shaped article of filaments may then be passed through an oridinary drying furnace, such as shown in FIG. 6, to be heated as with hot air, infrared rays or superheated steam to a temperature within the range of from 80° to 200° C., preferably from 100° to 160° C., for a period of from 10 to 60 minutes, preferably from 15 to 10 minutes. This treatment serves to effect post-setting on the shaped article. Then, the shaped article is cut to a prescribed size by a cutting device (not shown).

When the locked material thus produced is desired to possess still higher repulsive elasticity so as to be used as a cushion material, the aggregate block of filaments $F_2$ prior to application of the adhesive is subjected to a needling treatment by the needling device 22. This needling is effected by stabbing the aggregate a suitable number of times with needles each provided at the leading end thereof with at least one barb at a suitable needle density according to the method and apparatus disclosed in U.S. Pat. No. 4,172,174, for example. The diameter and length of these needles depend on the purpose of use. Generally, the diameter falls in the range of from 1.8 to 3.6 mm and the length in the range of from 50 to 2,000 mm. Generally the needles are each provided with 4 to 12 barbs. To be specific, the needling is accomplished by keeping a flat plate 27a, such as, for example, a perforated plate, a slit plate or a slit conveyor, underneath the lower side of the compression molded aggregate block of filaments $F_2$ in transit on the belt conveyor and alternately lowering and elevating the rows of needles relative to the upper side of the aggregate block $F_2$ through, or not through, the medium of a perforated plate or a slit plate, for example. Thus, the needling is effected on the aggregate block of filaments at a proper density. On the needle base, the needles are arranged either in one row or in two or more rows spaced suitably. The reciprocating motion of the needle base is accomplished by rotating the crank shaft 27 and consequently actuating the crank which is interlocked to the crank shaft and the needle base 22. While the needling treatment is in process, the aggregate block of filaments $F_2$ is moved at a speed such that the needling is effected at suitable intervals. The needle density is widely variable with the purpose for which the finally produced cushion material is used and the desired magnitude of compressive elasticity. The needle density increases, namely the intervals between needles decrease, in proportion as the desired magnitude of compressive elasticity increases. Generally, the needle density falls within the range of from 1 to 100 needles/100 $cm^2$ preferably from 4 to 50 needles/100 $cm^2$. After the aggregate block of filaments has undergone this needling treatment, it is subjected to the treatments for the application of the adhesive and the drying of the applied adhesive as described above.

FIG. 6 depicts another embodiment of the present invention, which comprises a filament feed device 101, a molding device 102, a first adhesive application device 103, a first induction heating device 104, a first drying device 153, a steam press device 154, a second adhesive application device 155, a second induction heating device 156, a second drying device 157 and a cutting device 158. In this apparatus, the filament feed device 101, the molding device 102, the first adhesive application device 103, and the first dielectric heating device 104 are substantially identical with the devices illustrated in FIGS. 3–5.

The aggregate of filaments $F_3$ to which a synthetic rubber type adhesive, for example, has been applied by the adhesive application device 103 is lifted in a substantially vertical direction and, at the same time, subjected to dielectric heating in the first induction heating device 104 to effect temporary adhesion on the aggregate block by causing the component filaments of the aggregate $F_3$ to be bonded mutually at their points of contact. The aggregate block is then forwarded by conveyor means 142, 143 to the first drying device 153. This first drying device 153 heats the aggregate block to a temperature within the range of from 80° to 200° C. such as with hot air or infrared rays to complete the drying of the adhesive applied to the aggregate of filaments $F_3$.

The resultant dry aggregate of filaments $F_4$, in the same press device 154, is pressed in the presence of steam at a temperature of from 100° to 120° C. for a period of from 30 seconds to 5 minutes, preferably from 1 to 3 minutes and thereafter cooled to a temperature in the range of from 20° to 60° C. The resultant pressed aggregate of filaments $F_5$ is introduced into the second adhesive application device 155, wherein a natural rubber type adhesive, for example, is applied to the aggregate similarly to the treatment performed in the first adhesive application device. The aggregate of filaments $F_6$ to which the adhesive has been applied is then lifted in a substantially vertical direction and, at the same time, passed through the second dielectric heating device 156 to evaporate the greater part of water or a solvent from the adhesive liquid. The second dielectric heating device 156 is identical with that illustrated in FIG. 5. The aggregate of filaments $F_7$ which has been dried in the second dielectric heating device 156 is forwarded by the conveyor devices 159, 160 such as conveyor belts to the second drying device 157, wherein the aggregate is completely dried similarly to the first drying device 153. After the drying, the aggregate is cut to a prescribed size by the cutting device 158.

The method and the apparatus for the manufacture of a locked material of filaments according to this invention essentially involve the steps of compression molding to a prescribed shape a disentangled wad of synthetic filaments containing three-dimensional crimps, applying an adhesive liquid to the shaped article of filaments obtained by the compression molding, and then lifting the shaped article in a substantially vertical direction and, at the same time, subjecting it to dielectric heating with a high-frequency electric wave to dry and harden the adhesive adhering to the aggregate. The excess adhesive liquid which has adhered to the shaped article in the adhesive liquid tank flows down the interior of the shaped article while the article is being lifted in a substantially vertical direction. Therefore, the amount of the adhesive which is proportionate to the concentration of the adhesive liquid used and the lifting speed of the aggregate is allowed to be uniformly dispersed and caused to adhere fast to the aggregate. Moreover, since the adhesive liquid which has thus adhered uniformly to the shaped article is exposed to dielectric heating with a high-frequency electric wave, it is dried in a very short period of time. The amount of the adhesive liquid suffered to flow down during the lift of the shaped article is small and the required amount of the adhesive liquid is permitted to adhere to the shaped article. While the shaped article is being lifted, there is no possibility of the shaped article being torn or otherwise damaged because of the weight of the article itself or the weight of the adhesive liquid adhering thereto. Since this invention effects the heating of the shaped article of filaments wet with the adhesive liquid by means of dielectric heating using a high-frequency electric wave, the solvent, particularly water, present in the adhesive liquid is first vaporized by the heat and, subsequently, the adhesive vehicle such as, for example, rubber is thermally cured without inflicting any damage upon the component synthetic filaments. Since the object of heating is an aggregate of filaments, the high-frequency electric wave penetrates it to a great depth enabling the aggregate to be uniformly heated to the core. Thus, possible loss of the adhesive liquid can be minimized.

According to the method and apparatus of the present invention, therefore, there can be obtained a locked material of filaments which has the adhesive dispersed uniformly therein and, therefore, can be used as a cushion material, a filter, a heat insulator or flooring.

Now, this invention will be described more specifically with reference to working examples.

EXAMPLES 1-7

Three-dimensionally crimped filaments about 60 mm in length, formed by twisting 300 denier polyester monofilaments into 300,000 denier total filaments were compression molded, subjected to needling at a needle density of about 16 needles/100 $cm^2$ and cut to a prescribed size. The resultant aggregate block of filaments was immersed in a natural rubber type adhesive latex composed of 100 parts by weight of natural rubber latex (having a solids content of 60% by weight), 1 to 3 parts by weight of a sulfur dispersant, 6 to 7 parts by weight of zinc white, 1 to 3 parts by weight of a dithiocarbamate type vulcanization accelerator (Noxcelor PX) and 30 parts by weight of water, and then lifted from the solution in a vertical direction and subjected to dielectric heating using an electric current of high frequency of 2,450 MHz at a current density of about 1 $kwh/cm^3$. The results were as shown in Table 1. After the induction heating, the aggregate block was held at 120° C. for 30 minutes to be cured. The locked material of filaments thus obtained was longitudinally divided into two halves, which were tested for bulk density. In every sample tested, the value of bulk density was alike in each pair of halves.

EXAMPLES 8-11

A shaped article of filaments prepared by following the procedure of Example 1 was immersed in a styrene-butadiene rubber type adhesive latex and thereafter subjected to dielectric heating using a high-frequency electric wave similar to Example 1. The results were as shown in Table 1. After this dielectric heating, the shaped article of filaments was held at 120° C. for 30 minutes to be cured. The locked material of filaments thus obtained was longitudinally divided into two halves, which were tested for bulk density. In every sample tested, the value of bulk density was alike in each pair of halves.

CONTROL

A shaped article of filaments prepared by the procedure of Example 1 was laid in a horizontal position and a natural rubber type adhesive similarly prepared was sprayed downwardly onto the shaped article. Then, the shaped article of filaments was heated at 130° C. for 30 minutes to afford a locked material of filaments (Refer to Japanese Patent Application No. 46373/1978). The locked material of filaments thus produced (having an bulk density of 0.055 $g/cm^3$) was longitudinally cut into two halves, which were tested for bulk density. The bulk density was 0.044 $g/cm^3$ in the upper half and 0.066 $g/cm^3$ in the lower half. Similar results were obtained in the case of the locked material obtained by following the procedure described above, except that the application of the adhesive was effected by the immersion technique.

TABLE 1

| Example | Size (mm × mm × mm) | Before immersion in adhesive solution: Amount applied (%) | Density ($g/cm^3$) | After immersion Density ($g/cm^3$) | After drying Density ($g/cm^3$) | Lifting speed (cm/min.) | Remarks |
|---|---|---|---|---|---|---|---|
| 1 | 58 × 52 × 492 | 42.0 | 0.034 | 0.064 | 0.059 | 8.8 | Dried well, no dripping of adhesive liquid |
| 2 | 60 × 60 × 495 | 45.8 | 0.033 | 0.070 | 0.061 | 15.2 | Dried well, no dripping of adhesive liquid |
| 3 | 59 × 60 × 498 | 51.7 | 0.034 | 0.086 | 0.071 | 22.7 | Dried rather well, film formed but dripping occurred to a position 11-12 cm from bottom |
| 4 | 55 × 59 × 497 | 51.1 | 0.035 | 0.090 | 0.072 | 28.5 | Dried rather well, film formed but dripping occurred to a position 13.5 cm from bottom |
| 5 | 55 × 58 × 495 | 52.8 | 0.032 | 0.083 | 0.067 | 34.9 | Dried rather well, film formed but dripping occurred to a position 15 cm from bottom |
| 6 | 51 × 57 × 494 | 51.7 | 0.034 | 0.089 | 0.071 | 41.4 | Dried rather well, film formed but dripping occurred to a position 15 cm from bottom |
| 7 | 60 × 57 × 495 | 51.7 | 0.035 | 0.090 | 0.071 | 46.0 | Dried rather well, film formed but dripping occurred to a position 17 cm from bottom |
| 8 | 40 × 40 × 490 | 22.9 | 0.028 | 0.041 | 0.036 | 8.8 | Dried well, no curing obtained. |
| 9 | 45 × 40 × 500 | 11.6 | 0.022 | 0.028 | 0.025 | 8.8 | Dried well, no curing obtained. |
| 10 | 40 × 45 × 500 | 36.6 | 0.023 | 0.039 | 0.036 | 8.8 | Dried well, no curing obtained. |
| 11 | 40 × 40 × 500 | 39.3 | 0.030 | 0.061 | 0.050 | 15.9 | Dried rather well, dripping occurred to a position 15 cm from bottom |

EXAMPLES 12-16

Shaped articles of filaments prepared by following the procedure of Example 1 were respectively immersed for a prescribed length of time in Vondic 1050, Vondic 1030, Vondic 1050NS, Vondic 1310-B and Hydran HW-311 as the polyurethane emulsions and then subjected to dielectric heating similarly to Example 1 for 8 minutes. The results were as shown in Table 2. After this dielectric heating the shaped article was cured at about 100° C. under water steam for 15 minutes and then held at 100° C. for 60 minutes to be cured. The locked material of filaments thus obtained was longitudinally cut into two halves, which were tested for bulk density. In every sample tested, the value of bulk density was alike in each pair of halves.

I claim:

1. A method for the manufacture of a locked material of filaments, which comprises compression molding in a prescribed shape short fibers of three-dimensionally crimped synthetic filaments, applying an adhesive liquid to the shaped article of filaments thus obtained, then lifting the shaped article in a substantially vertical direction and, at the same time, subjecting it to dielectric heating and thereby drying the adhesive adhering to the shaped article.

2. A method according to claim 1, which further comprises the step of subjecting the dried shaped article of filaments to post-curing by ordinary heating.

3. A method according to claim 1, wherein the frequency of the high-frequency electric wave falls within the range of from 1 MHz to 300 GHz.

4. A method according to claim 1, wherein the frequency of the high-frequency electric wave falls within the range of from 10 MHz to 30 GHz.

5. A method according to claim 1, in the adhesive liquid applied to the shaped article of filaments is heat-curable and the dried shaped article is further heated to effect drying and curing of it.

6. A method according to claim 1, which further comprises the step of needling the shaped article of filaments with needles each provided with at least one barb in the direction in which a prescribed magnitude of compressive elasticity is desired to be conferred upon the shaped article, said step being performed prior to the application of the adhesive to the shaped article of filaments which has undergone compression molding.

7. A method according to claim 1, wherein the shaped article of filaments has a bulk density within the range of from 0.002 to 2 g/cm$^3$.

8. A method according to claim 6, wherein the needling is effected at a needle density within the range of from 1 to 100 needles/100 cm$^2$.

9. A method according to claim 1, which comprises the further steps of post-curing, applying adhesive liquid to the cured shaped article of filaments and subsequently lifting it in a substantially vertical direction and, at the same time, subjecting it to dielectric heating with a high-frequency electric wave thereby drying the adhesive adhering to the dried and cured shaped article.

10. A method according to claim 9, which comprises the further step of additionally subjecting the shaped article of filaments a second post-curing step.

11. A method according to claim 2, wherein after the first post-curing is effected, the shaped article of filament is heated in the presence of steam.

12. An apparatus for the manufacture of a locked material of filaments, which comprises means for compression molding short fibers of three-dimensionally crimped synthetic filaments, means for conveying the shaped article of filaments produced by said compression molding means and, at the same time, applying an adhesive liquid to the shaped article in transit, means for lifting in a substantially vertical direction the shaped article of filaments to which the adhesive has been applied, and means for dielectric heating the thus treated shaped article.

13. An apparatus according to claim 12, wherein the means for lifting in a substantially vertical direction the shaped article of filaments to which the adhesive liquid has been applied is formed of at least two rows of a plurality of needles adapted so that the two rows of needles are alternately inserted in a horizontal direction into the shaped article.

14. An apparatus according to claim 12, which further comprises a heating device adapted for post-curing of the shaped article of filaments, said heating device being disposed subsequently to the dielectric heating device.

15. An apparatus according to claim 12 which further comprises needling means provided with reciprocatingly movable needles each containing at least one barb, said needling means being disposed between the compression molding means and the adhesive-applying means.

16. An apparatus for the manufacture of a locked material of filaments, which comprises means for compression molding short fibers of three-dimensionally crimped synthetic filaments, first adhesive application means serving to convey the shaped article of filaments produced by said compression molding means and, at the same time, apply an adhesive liquid to the shaped article in transit, first lifting means serving to lift in a substantially vertical direction the shaped article of filaments to which the adhesive liquid has already been applied, first dielectric heating means, first drying means, second adhesive application means serving to convey the shaped article of filaments dried in the first drying means and, at the same time, apply the adhesive liquid to the shaped article in transit, second lifting means for lifting in a substantially vertical direction the shaped article of filaments having the second adhesive solution applied thereto, second dielectric heating means for drying it, and second drying means for curing it.

17. An apparatus according to claim 16, which further comprises needling means provided with reciprocatingly movable needles each containing at least one barb, which needling device being disposed between to the compression molding means and the first adhesive application.

18. The apparatus according to claim 17, which further comprises steam press means disposed between the first drying means and second adhesive application means.

* * * * *

UNITED STATES PATENT AND TRADEMARK OFFICE
CERTIFICATE OF CORRECTION

PATENT NO. : 4,298,418    Page 1 of 2
DATED : November 3, 1981
INVENTOR(S) : Sadaaki Takagi It is certified that error appears in the above—identified patent and that said Letters Patent is hereby corrected as shown below:

Figure on title page (Fig. 3) and second sheet of drawings, Figure 3, both occurrences; bottom portion of segment of Figure 3 shown, reference numeral, 24a;

Col. 3, line 49; "fillaments" should read -- filaments --
Col. 6, line 38; insert -- of the -- after "other" ("of the" was not deleted in the Response and Amendment)

UNITED STATES PATENT AND TRADEMARK OFFICE
CERTIFICATE OF CORRECTION

PATENT NO. : 4,298,418

DATED : November 3, 1981

INVENTOR(S) : Sadaaki Takagi

It is certified that error appears in the above—identified patent and that said Letters Patent is hereby corrected as shown below:

Col. 10, line 15; "an" should read -- a --
Col. 11, line 20; "in the" should read -- in which the --  Response and Amendment dated January 30, 1981, page 4.
Col. 12, line 48; delete "to" at the end of the line.  Response and Amendment dated January 30, 1981, page 5.

Signed and Sealed this

Twenty-third Day of February 1982

[SEAL]

Attest:

GERALD J. MOSSINGHOFF

Attesting Officer

Commissioner of Patents and Trademarks